Feb. 21, 1967     H. J. SHAFER     3,304,842
NON-HAMMER POPPET VALVE CONTROL
Filed April 20, 1964     3 Sheets-Sheet 1

FIG. I

INVENTOR.
HOMER J. SHAFER
BY Hamilton & Cook
ATTORNEYS

Feb. 21, 1967  H. J. SHAFER  3,304,842
NON-HAMMER POPPET VALVE CONTROL
Filed April 20, 1964  3 Sheets-Sheet 2

INVENTOR.
HOMER J. SHAFER
BY Hamilton D Cook
ATTORNEYS

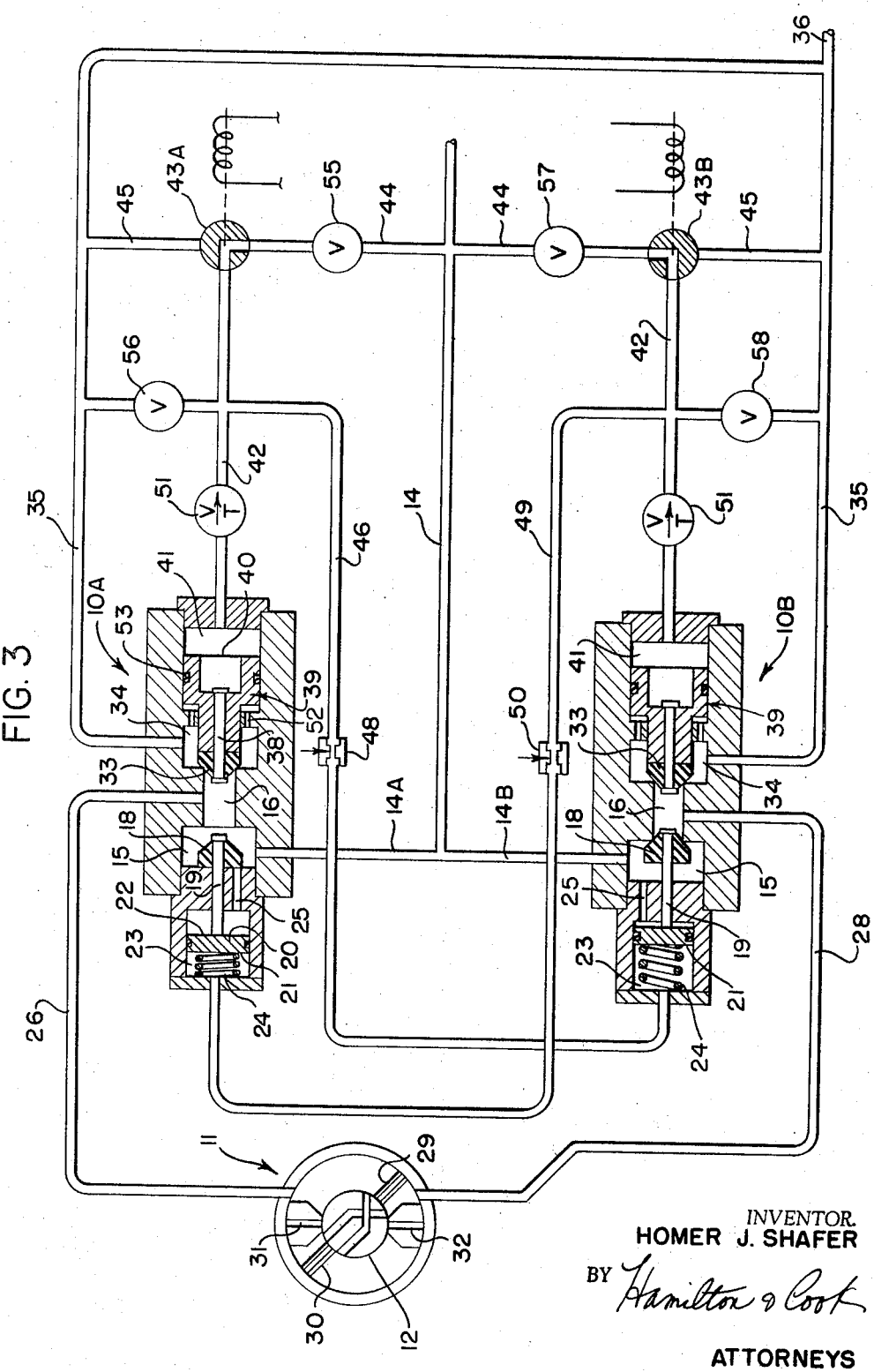

United States Patent Office 3,304,842
Patented Feb. 21, 1967

3,304,842
NON-HAMMER POPPET VALVE CONTROL
Homer J. Shafer, P.O. Box 83, Mansfield, Ohio 44901
Filed Apr. 20, 1964, Ser. No. 361,096
7 Claims. (Cl. 91—454)

The present invention relates generally to a fluid system for controlling a valve of the type used to control the flow in a high pressure pipe line.

Because a power source is readily available in a high pressure pipe line itself, and because the valving installations are often remotely located, it has been found advantageous to utilize the pipe line pressure as the power source for operation of the valve.

In my previous U.S. patent, No. 2,849,987, issued on September 2, 1958, I disclosed a typical valve installation in which the valve operator effects opening and closing of the pipe line valve by pairs of opposed, interconnected poppet valves. Such a construction works quite well for most installations. However, in an installation where it is desirable to connect the pressure fluid in the pipe line directly to the pipe line valve and thus simplify the valve operator control, the opposed poppet valve arrangement is subject to fluid hammer.

It has long been a well-known fact that the sudden stopping of the flow of fluid in a pipe will cause a sudden rise in the pressure in that portion of the pipe line between the source of flow and the means by which the flow is checked. A poppet type valve acts with such suddenness that in some cases the rise in pressure may be sufficiently large to cause bursting of the pipe. Moreover, when the valve element which causes the sudden closing of the flow moves in the same direction as the flow it will be slammed into its seat with additional attendant damage.

The degree of the hammer—i.e., sudden increase in the pressure—is directly related to the elasticity of the pipes and the compressibility of the fluid. For example, if the whole mass of the fluid were incompressible and the walls of the pipe were inelastic, an instantaneous reduction of the velocity to zero would create an infinite pressure against the valve and pipe. Instead, it must be realized that all fluids are to some extent compressible and all pipes to some extent elastic. Thus, as the fluid is suddenly stopped, its kinetic energy causes the fluid to compress and the pipe walls to stretch. The kinetic energy is thereby changed to pressure energy which can be mathematically computed and which, under even normal conditions, can well exceed the maximum pressure to which the pipe and valve can be safely subjected.

It is therefore an object of the present invention to provide a novel operator control for a hydraulic valve which can open and close line pressures to the valve operator without causing hammer or damaging pressure rises.

It is another object of the present invention to provide a valve operator control, as above, which subjects the valve operator to full line pressure only during operation of the valve.

It is a further object of the present invention to provide a valve operator control, as above, which provides a pressure relief valving to the valve operator.

It is a still further object of the present invention to provide a valve operator control which provides the above objectives and yet is efficient in operation, compact in installation, and economical to produce and maintain.

These and other objects which will become apparent from the following specification are accomplished by means hereinafter described and claimed.

One preferred embodiment of the present invention is shown by way of example in the accompanying drawings and described in detail without attempting to show all of the various modifications in which the invention might be embodied; the invention being defined by the appended claims and not by the details of the specification.

In the drawings FIG. 1 is a schematic view of a control system employing the novel operator mechanism to control a hydraulic valve, showing the system in a static condition with the valve closed.

FIG. 3 is a similar view, showing the poppet valves in the positions just prior to stopping the operator and returning the system to static condition.

Figure 1:
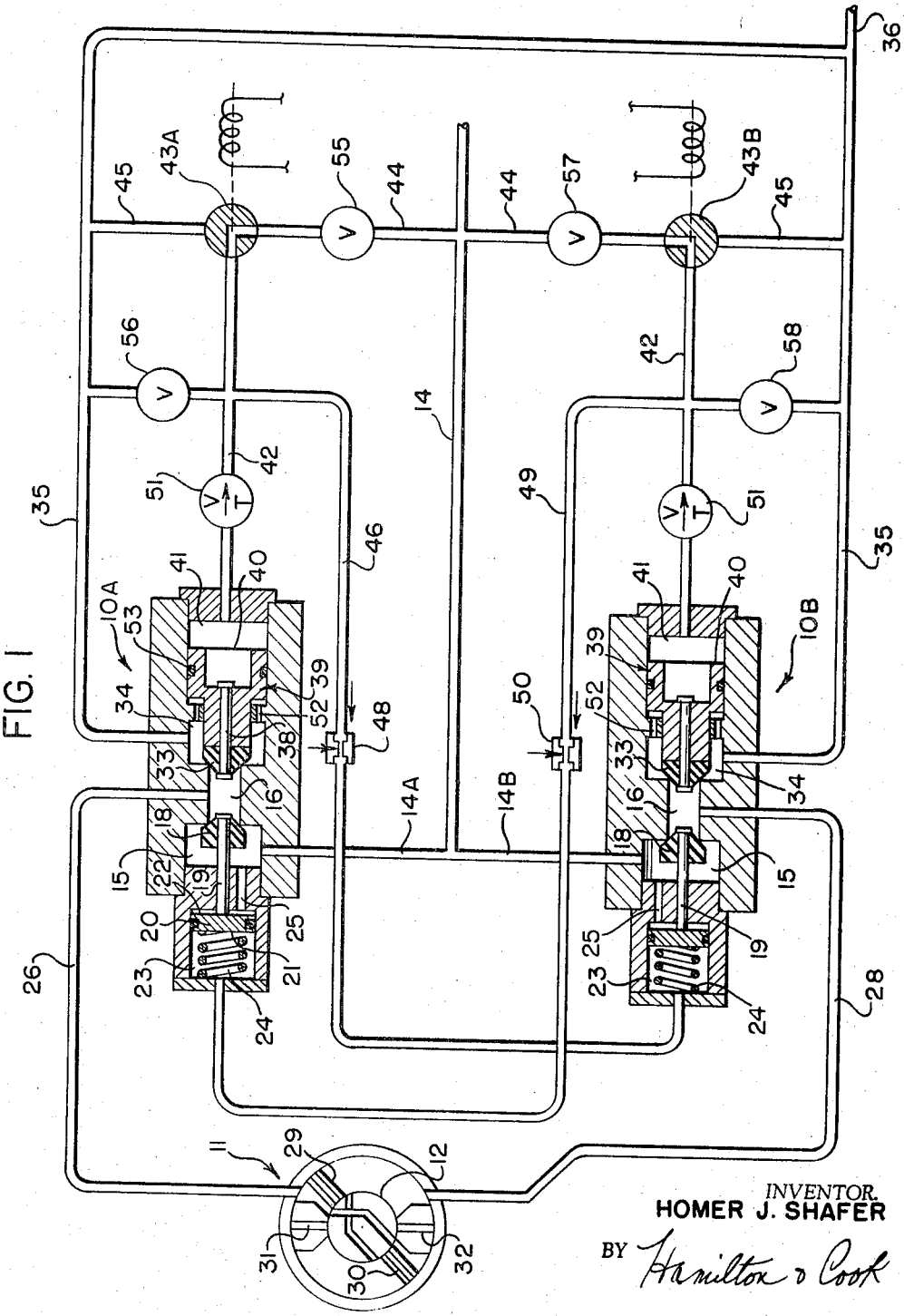

In general, a hydraulic operator control according to the concept of the present invention is comprised of two identical sub-assemblies 10A and 10B which are interconnected to operate the motor means, or operator, of a valve from a fluid power source. Each of the sub-assemblies has a dispensing chamber which connects to the hydraulic motor means or operator, by which the valve is opened and closed. Each dispensing chamber is in turn connected to the fluid power source through an input valving means.

The third connection to each dispensing chamber is to a discharge means through an exhaust valving means. The exhaust valving means are individually connected to be selectively closed by the fluid pressure source, and the two sub-assemblies are cross connected in such a way that when the operator is actuated to close the exhaust valving means into the first dispensing chamber (i.e., the dispensing chamber in the first sub-assembly 10B), the input valve means into the second dispensing chamber (i.e., the dispensing chamber in the second sub-assembly 10A) will be thereafter sequentially closed. Similarly, when the operator is actuated to close the exhaust valving means into the second dispensing chamber, the input valving means into the first dispensing chamber is thereafter sequentially closed.

Referring more particularly to the drawings, the sub-assemblies 10A and 10B are connected to operate the motor means 11 of the high pressure valve, not shown. While the motor means may be a piston or any other double acting pressure operated mechanism it is shown as a hydraulic rotary vane motor, the rotor 12 of which is keyed to the stem of the valve.

When the valve, operated by a motor means 11, is utilized in conjunction with a pipe line transporting gas, air or liquid under pressure the fluid pressure source may be the pipeline itself. Thus, the main feed line 14 to the operator may be attached directly to the pipeline. It must be noted that such a connection must be on the high pressure side of the valve in order to provide operative power when the valve is closed.

The main feed line 14 divides into two branches 14A and 14B which respectively connect to the power chambers 15 in sub-assemblies 10A and 10B. Because of the identity of the sub-assemblies, only one will be described with the numerical designations placed on one or both, as clarity dictates.

The power chamber 15 connects to a dispensing chamber 16 past an input valve 18. The input valve 18 is connected, by rod 19, to a closing piston 20. The closing piston 20 has two opposed work faces 21 and 22. The work face 21 is directed against a closing chamber 23 in which it is slidably received. A compression spring 24 is also positioned in the closing chamber 23 and engages the work face 21 biasingly to urge the input valve 18 against its seat and close the dispensing chamber 16 to the power chamber 15.

The second face 22 of the closing piston 20 is directed against the fluid pressure in power chamber 15 by a passage 25 which extends from the power chamber 15 into that portion of chamber 23 directed against piston face 22.

Dispensing chamber 16 in sub-assembly 10A communicates with the motor means 11 by a suitable conduit 26 and the dispensing chamber 16 in sub-assembly 10B communicates with the motor means 11 by a similar conduit 28.

Preferably, the rotor 12 of motor means 11 is a rotary piston provided with two diametrically opposed vanes 29 and 30 which rotate through substantially 90° between diametrically opposed stationary shoes 31 and 32. The conduit 26 preferably supplies pressure fluid to one side of vane 29 and through cross conduits in the rotor to the other side of the opposite vane 30 so that the pressure will be applied equally to both vanes as the rotor rotates in a clockwise direction with balanced torque. Similarly, conduit 28 exhausts pressure fluid from the chambers on the opposite sides of the respective vanes as the motor rotates in a clockwise direction. To rotate the rotor in a counterclockwise direction, the flow through the motor is reversed, in which case the conduit 28 becomes the supply conduit and conduit 26 becomes the exhaust conduit.

The foregoing description of the motor means 11 constitutes no part of the present invention except to show a typical installation in which the subject operator may be employed. For more details relative to such motor means one may refer to my U.S. Patent No. 2,778,338.

Returning now to the detailed description of the preferred form of the operator disclosed herein, the dispensing chamber 16 also communicates with an exhausting means. Specifically, the dispensing chamber 16 communicates past exhaust valve 33 with an exhaust chamber 34. Exhaust chamber 34 is connected, by conduit 35, to exhaust 36. As a practical matter the exhaust 36 may empty into the atmosphere, a reservoir tank, not shown, or, if it is that the low pressure side of the hydraulic valve operated by motor means 11 will never be equal to or greater than the high pressure side, the exhaust 36 may empty into the low pressure side of the line.

The exhaust valve 33 is connected, by rod 38, to the shank of a piston 39 the face 40 of which is directed against the closing chamber 41. The closing chamber 41 is selectively connected to the fluid pressure power source by a conduit 42 which is joined, by a three-way solenoid valve 43, and a take-off feed line 44, to the main feed line 14. The third port of the three-way valve 43 is connected to the exhaust conduit 35 by a joining line 45.

For clarity, the three-way solenoid valve connected to sub-assembly 10A will be designated as 43A and the valve connected to sub-assembly 10B will be designated 43B but the connecting conduits 42, 44 and 45 will remain identically numbered.

Sub-assemblies 10A and 10B are also cross connected. The conduit 46 joins the closing chamber 41 for the exhaust valve 33 in sub-assembly 10A to the closing chamber 23 for the input valve 18 in sub-assembly 10B. A variable resistance orifice, or valve, 48 for restricting flow therethrough is interposed along conduit 46 to control the action of valve 18 in sub-assembly 10B for a purpose more fully hereafter described. Similarly too, a variable resistance orifice, or valve, 50 is interposed along conduit 49. Throttling valves 51 are provided in lines 42 which reduce flow only in the direction of the arrows, and the orifice valves 48 and 50 are set to permit a greater rate of flow than throttling valves 51 for a purpose to be described.

In use, the subject operator would operate as follows: Under static conditions the valves 18 and 33 in both sub-assemblies 10A and 10B are normally closed. To accomplish this valves 43A and 43B are set to provide free flow from the feed line 14 through conduit 42 into the closing chamber 41, as shown. With the valves thus positioned a static condition of the operator finds the line pressure in chambers 41 fully effective through conduits 46 and 49 into the respective closing chambers 23.

Figure 2:
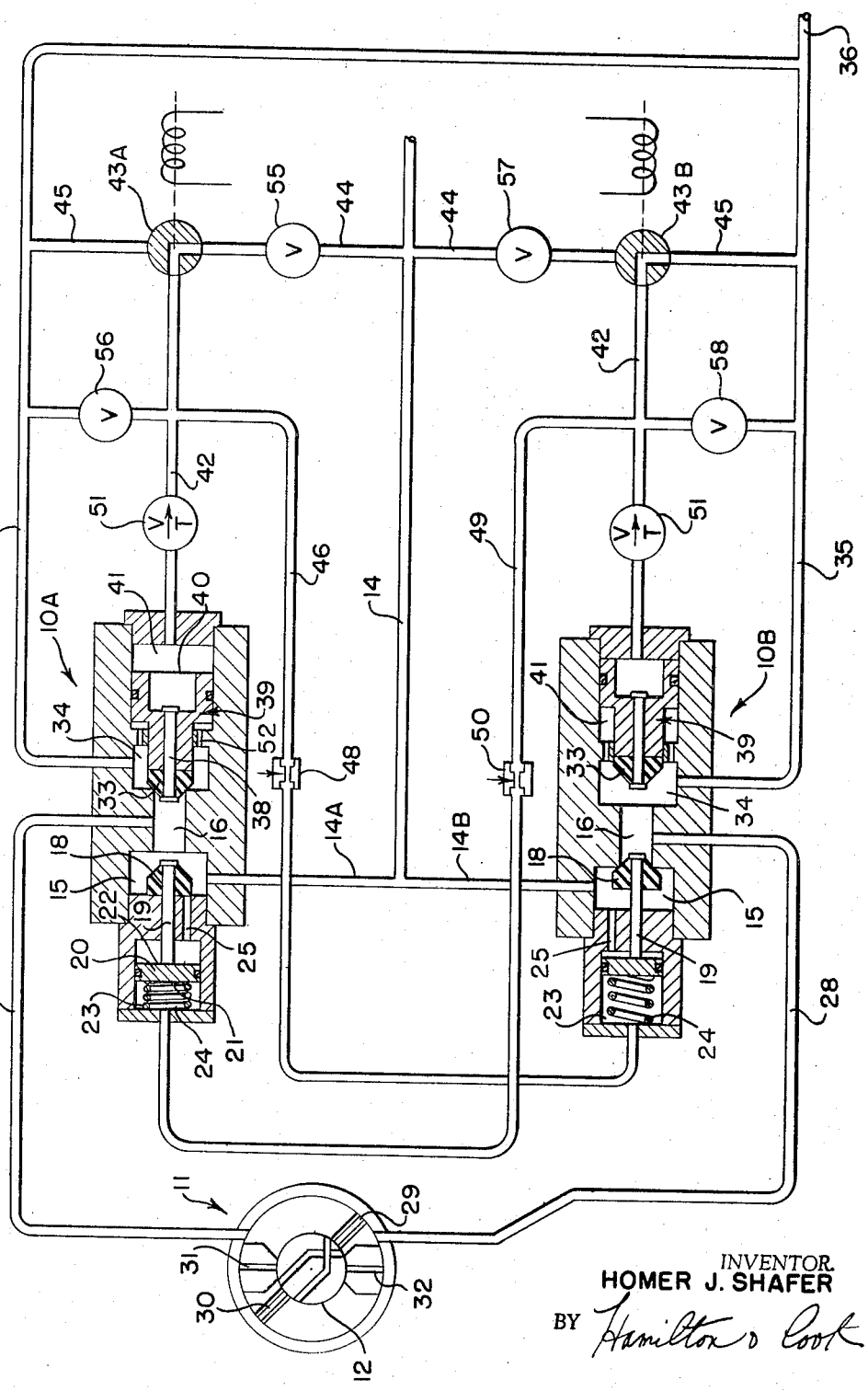
FIG. 2 is a similar view, showing the poppet valves in the positions for turning the operator to close the main valve.

To rotate the rotor 12 of the motor 11 in a clockwise direction, the solenoid operated valve 43B is turned as seen in FIG. 2, so that chamber 23 of sub-assembly 10A is connected through orifice 50 and line 49 to exhaust, and chamber 41 of sub-assembly 10B is connected through throttling valve 51 and line 42 to exhaust. The reduction of pressure against piston face 21 in closing chamber 23 of sub-assembly 10A causes valve 18 therein to open, since the effective area of face 22 exceeds the effective area of valve 18 exposed to fluid pressure in power chamber 15 by an amount sufficient to overcome the spring 24. Because the rate of flow through throttling valve 51 is less than that through orifice valve 50, the reduction in pressure in chamber 41 of sub-assembly 10B will cause valve 33 to open subsequently to the opening of valve 18 in sub-assembly 10A, and thus prevent shock loads or hammer in the motor 11 resulting from exhausting fluid from the motor before the supply fluid is introduced. With the poppet valves in the positions of FIG. 2, flow from the power line 14 through supply line 26 will rotate the rotor 12 in a clockwise direction; and fluid on the opposite sides of vanes 29 and 30 exhausts through conduit 28, chamber 16 and line 35.

When it is desired to stop the clockwise rotation of motor 11, solenoid operated valve 43B is returned to its position wherein power flow is available from the take-off feed line 44 to conduit 42 and into closing chamber 41 in sub-assembly 10B, as seen in FIG. 3. The line pressure in closing chamber 41 seats valve 33 onto its seat against the cushioning effect of the exiting flow from dispensing chamber 16 to exhaust chamber 34, to preclude hammer initiated at this point.

As soon as the exiting flow ceases, pressure on opposite sides of the vanes 29 and 30 is equalized and the rotor 12 immediately ceases rotation. Sequentially thereafter, because of the restricted flow through the variable resistance valve 50 in conduit 49, the line pressure is obtained in closing chamber 23 of sub-assembly 10A. By that time flow from power chamber 15 into dispensing chamber 16 and sub-assembly 10A will have ceased and the input valve 18 will move to closed position against the static pressure so that deleterious hammer is not induced at this point.

Should it be desirable to rotate the motor in a counterclockwise direction, the solenoid operated valve 43A would be activated and the corresponding conditions described above would be obtained to effect counterclockwise rotation.

It has been found that the addition of the compression springs 24 to assist with the closing of the input valve 18 is required since, when the valve 18 is opened after closure of the cross connected exhaust valve, the static opposing pressures thereon would be substantially equal and the valve might not otherwise close. Spring 24 further serves to retain the input valve 18 closed when subjected to surges in the line pressure which would be felt against face 22 before they would be balanced by action against the face 21 due to the delay of flow through valve 48. Similarly, surges in pressure, due to temperature or the like, which might occur in the motor 11, are thus operable to open the exhaust valve, which is held closed solely by the pressure in closing chamber 41, rather than the input valve 18, thereby permitting the excess fluid to exhaust through chamber 34 and out conduit 35.

It should further be noted that relief ports 52 are provided from exhaust chamber 34 to the back of piston 39 so that should fluid seep past sealing means 53 it would not block the free closing of the exhaust valve 33.

To permit hand operation of the valve operator, should the necessary electrical energy to operate valves 43A and 43B fail, hand valves 55–58, inclusive, are provided. Valves 55 and 57 would be normally opened and valves 56 and 58 would be normally closed. Rotation of the motor 11 would then be effected as above with hand valves 55 and 56 operated to control flow the same as 43A and valves 57 and 58 the same as valve 43B.

A valve operator control embodying the concept of the present invention accordingly accomplishes the objects thereof.

What is claimed is:

1. A fluid control for a double-acting fluid motor operator for a valve comprising, first and second dispensing chambers connected to opposite sides of said motor means, a fluid power source, an individual input valving means connecting each dispensing chamber with said power source, spring means normally biasing each said input valving means to close the dispensing chamber to said power source, a discharge means, an individual exhaust valving means connecting each dispensing chamber with said discharge means, a piston means connected to each said input valving means, each said piston means slidably disposed in a chamber to form fiirst and second opposed work chambers, one on each side of said piston, means connecting said first work chamber with said power supply to open said input valving means, a closing chamber for each exhaust valving means in selective communication with said power source, restrictive flow means connecting the closed chamber of the exhaust valving means communicating with the fisrt dispensing chamber with the second work chamber of the piston means connected to the input valving means communicating with said second dispensing chamber, and simliar restrictive flow means connecting the closing chamber of the exhaust valving means communicating with said second dispensing chamber with the second work chamber of the piston means connected to the input valving means communicating with said first dispensing chamber, the effective work area of the piston exposed to said first work chamber being greater than the effective work area of the input valving means exposed to said fluid power source.

2. A fluid control for a double-acting fliud motor operator for a pipeline valve comprising, a first and second interconnected control sub-assembly, each control sub-assembly comprising, a dispensing chamber, conduit means connecting the dispensing chamber in one said sub-assembly to one side of said motor operator and similar conduit means connecting the dispensing chamber in the other said sub-assembly to the second side of said motor operator, a power chamber, an input valving means connecting said power chamber to said dispensing chamber, conduit means connecting a power source to said power chamber, a discharge means, an exhaust valving means connecting said discharge means to said dispensing chamber, a separate closing chamber for the input and exhaust valving means, a closing piston in each said closing chamber connected to the respective valving means, the closing piston connected to said input valve means having opposed work faces, one of said opposed work faces directed against said closing chamber, the second of said opposed work faces directed against the fluid pressure in said power chamber, a spring means normally biasing said input valve means to close the dispensing chamber to said power chamber and in which the effective work area of the face of said closing piston connected to said input valving means exposed to the pressure in said power chamber is greater than the effective work area of the input valving means exposed to to the fluid pressure in said power chamber, means selectively connecting said power source to said closing chamber for said exhaust valving means, conduit means connecting the closing chamber for said exhaust valving means in the first control sub-assembly with the closing chamber for the input valving means in said second control sub-assembly, a restrictive flow orifice in said last mentioned conduit means, a similar conduit means connecting the closing chamber for said exhaust valving means in the second control sub-assembly with the closing chamber for the input valving means in the first control sub-assembly, and a restrictive flow orifice in said last mentioned conduit means.

3. A non-hammer fluid control for a double-acting fluid motor operator connected to an exhaust conduit and a single fluid power source conduit, the pressure in which is greater than that in said exhaust conduit, said operator comprising, first and second dispensing chambers connected to opposite sides of said motor operator, an individual input valving means connecting each dispensing chamber with the full pressure of said power source conduit, an individual exhaust valving means connecting each dispensing chamber with said discharge conduit, conduit means for transmitting the full pressure of said power source to close the exhaust valving means to each dispensing chamber, first restrictive flow means connecting the full pressure of said power source which is transmitted to close the exhaust valving means for said first dispensing chamber with the input valving means for said second dispensing chamber whereby said input valving means closes sequentially after said exhaust valving means, second restrictive flow means connecting the full pressure of said power source which is transmitted to close the exhaust valving means for said second dispensing chamber with the input valving means for said first dispensing chamber whereby said input valving means closes sequentially after said exhaust valving means.

4. A non-hammer fluid control, as set forth in claim 3, in which the conduit means for transmitting the full pressure of said power source to close the exhaust valving means for each dispensing chamber communicates with an exhaust valve closing chamber for each exhaust valve and is provided with a throttling valve which reduces only the rate of flow for fluid exiting from said exhaust valve closing chamber to a rate less than flow through said restrictive flow means.

5. A non-hammer fluid control, as set forth in claim 4, having a piston means connected to each said input valving means, each said piston means being sildabiy disposed in a chamber to form first and second opposed work chambers, one on each side of said piston, conduit means connecting said first work chamber with the full pressure of said power source to urge said input valving means to open, the second work chamber associated with the piston means connected to the input valving means for said first dispensing chamber communicating with the exhaust valve closing chamber associated with the exhaust valve for said second dispensing chamber and the full pressure of said power source through said second restrictive flow means and the second work chamber associated with the piston means connected to the input valving means for said second dispensing chamber communicating with the exhaust valve closing chamber associated with the exhaust valve for said first dispensing chamber and the full pressure of said power source through said first restrictive flow means.

6. A non-hammer fluid control, as set forth in claim 5, having spring means normally biasing each said input valving means to close the dispensing chambers to the full pressure of said fluid power source.

7. A non-hammer fluid control, as set forth in claim 6, in which the effective work area of the piston exposed to said first work chamber is sufficiently greater than the effective work area of the input valving means exposed to the full pressure of said power source to overcome the biasing action of said spring means.

References Cited by the Examiner

UNITED STATES PATENTS

| | | | |
|---|---|---|---|
| 2,569,881 | 10/1951 | Davies | 91—454 |
| 2,911,005 | 11/1959 | Adelson | 91—454 X |
| 2,984,257 | 5/1961 | McCormick | 137—596.16 |

MARTIN P. SCHWADRON, *Primary Examiner.*

SAMUEL LEVINE, *Examiner.*

P. T. COBRIN, P. E. MASLOUSKY,
*Assistant Examiners.*